United States Patent [19]

Caniglia et al.

[11] Patent Number: 4,955,914
[45] Date of Patent: Sep. 11, 1990

[54] TEETHING RAIL FOR SHOPPING CART

[76] Inventors: Leslie A. Caniglia, 11935 SW. 15 Ct., Davie, Fla. 33325; Cathy S. Palicka, 53990 Steinersville, Powhattan Pt., Ohio 32942

[21] Appl. No.: 449,433

[22] Filed: Dec. 11, 1989

Related U.S. Application Data

[63] Continuation of Ser. No. 240,143, Aug. 26, 1988, abandoned.

[51] Int. Cl.$^5$ ............................................. A61J 17/00
[52] U.S. Cl. .................................................... 606/235
[58] Field of Search .................. 606/234–236; D8/DIG. 8, 303, 82–84; 74/551.8, 551.9, 558.5; 293/109, 122; 81/171.1, 489; 16/DIG. 12, DIG. 19

[56] References Cited

U.S. PATENT DOCUMENTS

| | | | |
|---|---|---|---|
| 2,425,245 | 8/1947 | Johnson | 74/551.9 |
| 3,866,649 | 2/1975 | Bringmann | 150/52 R |
| 4,308,762 | 1/1982 | Jannard | 74/551.9 |
| 4,441,382 | 4/1984 | Snooks | 74/558 |

*Primary Examiner*—C. Fred Rosenbaum
*Assistant Examiner*—William W. Lewis
*Attorney, Agent, or Firm*—Oltman and Flynn

[57] ABSTRACT

A teething rail which can be snapped on and off of the handle of a shopping cart and can be chewed safely by a teething baby when riding in the seat of the shopping cart. The teething rail is a split tube which preferably has a center portion with raised elements on which the baby can chew pleasantly.

2 Claims, 1 Drawing Sheet

U.S. Patent    Sep. 11, 1990    4,955,914
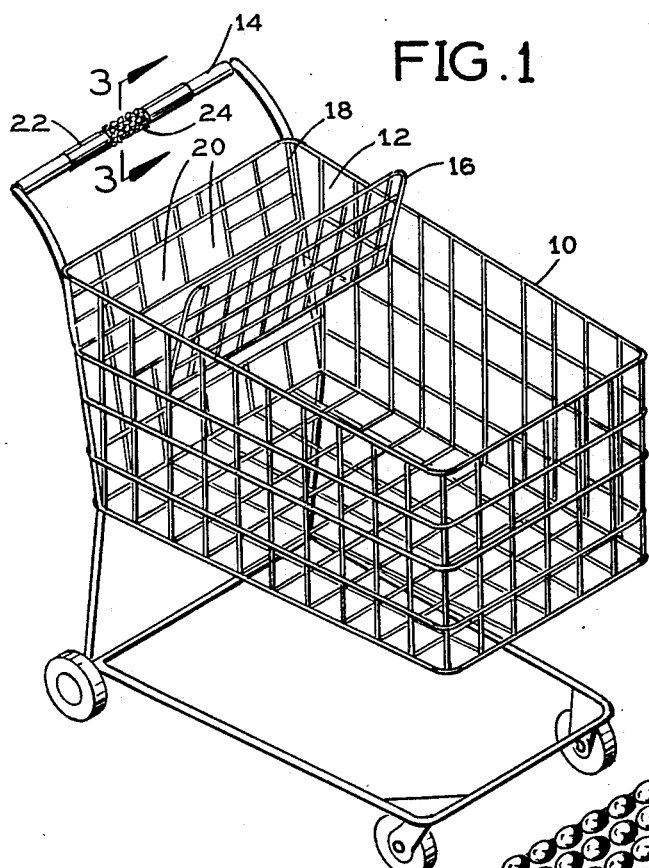
FIG. 1
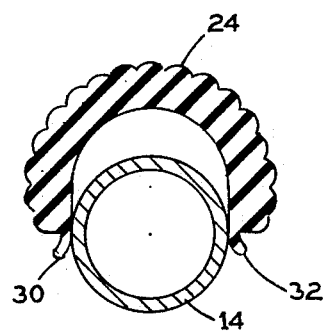
FIG. 4
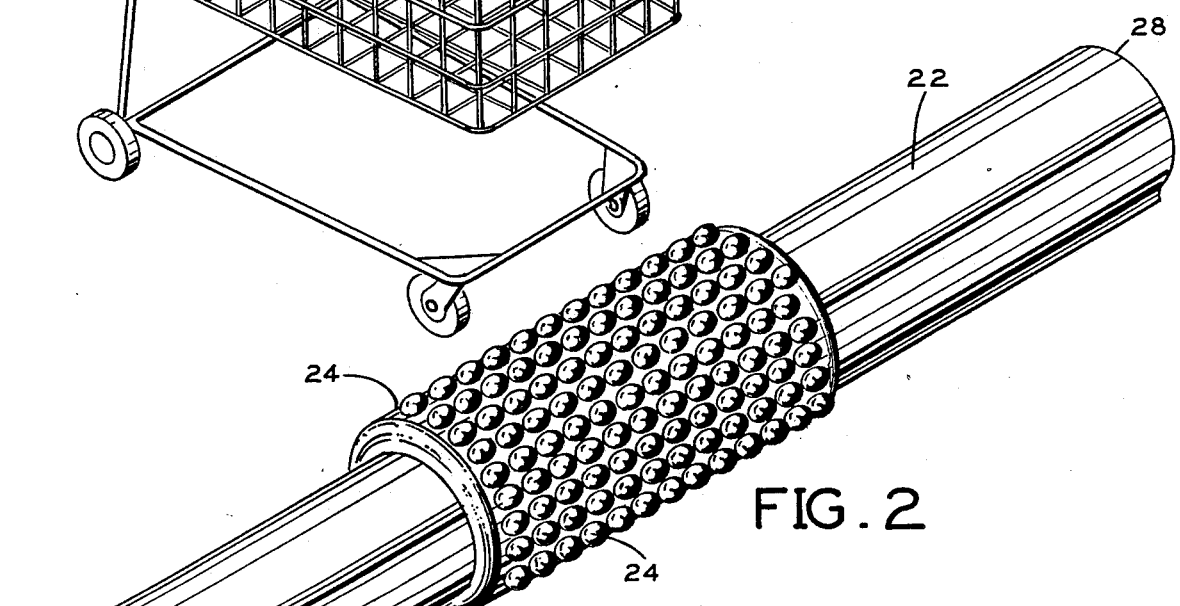
FIG. 2
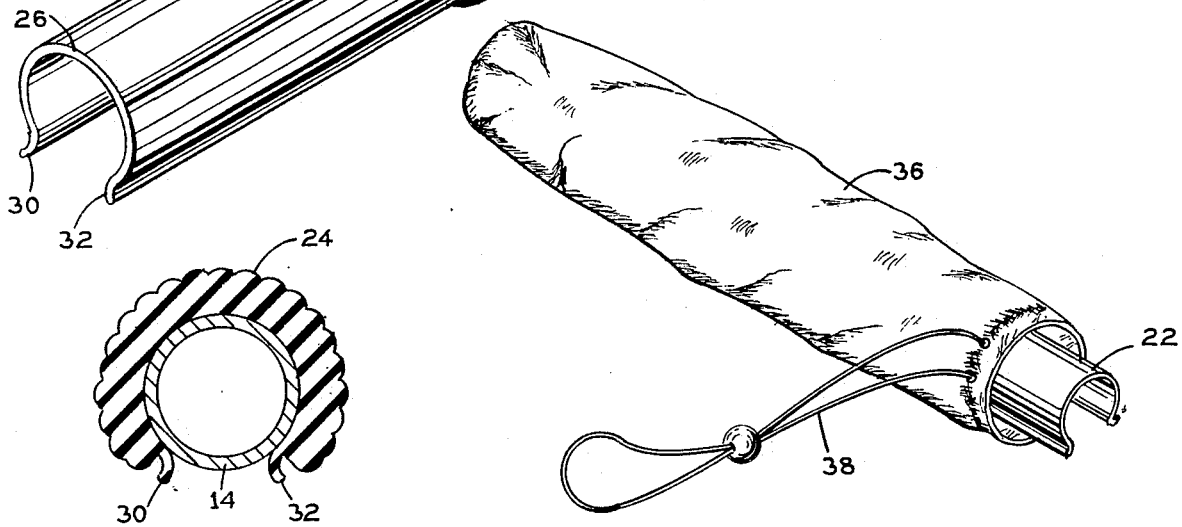
FIG. 3
FIG. 5

TEETHING RAIL FOR SHOPPING CART

This application is a continuation of application Ser. No. 07/240143, filed 8/26/88, abandoned.

BACKGROUND OF THE INVENTION

This invention relates to a teething rail for use on the handle of a shopping cart.

Teething rings for babies are well-known. They usually consist of a ring of soft rubber which the baby can chew to relieve the sensations associated with teething. However, when a baby accompanies its mother on a grocery shopping trip, the baby is often carried in a seat in a shopping cart facing the cart's handle. The baby often leans over and chews on the handle, especially if it is teething, and this can be unsanitary. Covers for shopping cart handles are known, for example in U. S. Pat. No. 3,866,649—Bringmann, but such covers do not have special provisions for a teething baby and are typically fastened by means of a zipper.

SUMMARY OF THE INVENTION

The present teething rail for use on the handle of a shopping cart is a soft, resilient split tube which can be snapped on and off of the shopping cart handle and which has a central portion with raised elements constituting teething means on which a baby can easily chew to relieve the sensations of teething. The teething rail can be conveniently carried in a small bag to keep it sanitary before use, and it can also be cleaned easily with soap and water between uses. It is preferably made of soft rubber similar to the material of a teething ring so that it will not injure the gums of the baby and so that it will be resilient enough to snap easily on and off of the shopping cart handle and will grip the shopping cart handle to keep it in place when in position on the handle of the shopping cart.

Accordingly, it is an object of the present invention to provide a soft and safe, snap-on, baby's teething rail for use on the handle of a shopping cart.

Another object of the invention is to make the teething rail such that it can be easily sanitized and kept in a sanitized condition between uses.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a perspective view of a typical shopping cart having a seat facing a horizontal handle and having a teething rail in accordance with the preferred embodiment of the invention on the handle;

FIG. 2 is a perspective view of the teething rail of FIG. 1;

FIG. 3 is a cross-sectional view taken across the center of the teething rail as viewed along line 3—3 of FIG. 1;

FIG. 4 is a sectional view similar to FIG. 3 illustrating how the teething rail can be snapped onto and off of the shopping cart handle; and FIG. 5 is a perspective view showing a teething rail enclosed in a bag for carrying purposes.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

The shopping cart 10 shown in FIG. 1 is a standard shopping cart having a seat 12 at the upper rear of the cart in which a baby can sit facing the horizontal handle 14 of the cart. The seat has a back 16 and a front 18 with openings 20 through which the baby's legs can project. As can be seen, it is very easy for the baby, when seated in the seat 12, to lean over and chew on the handle 14, and this happens frequently if the baby is teething.

The teething rail 22 is shown on the handle 14 in FIG. 1 and is shown in an enlarged view on FIG. 2. The teething rail 22 is a soft, very resilient split tube which has an enlarged center portion 24 and opposite end portions 26 and 28. The rail 22 extends almost but not quite a complete circle and it has longitudinal edges 30 and 32 which flare outwardly slightly from the circle. When the rail 22 is snapped onto the handle 14 in the manner shown in FIG. 4, the edges 30 and 32 spread slightly to allow the rail to pass over the handle and seat firmly in place in the manner shown in FIG. 3 where the rail grips the handle to hold it firmly in place. The flared edges 30 and 32 make it easy for the rail to spread as it is positioned over the handle when slipping it on. The edges 30 and 32 are spaced apart less than the diameter of the tubular handle 14 and the inside diameter of the split tube is less than the diameter of the handle 14.

The enlarged central portion 24 has a plurality of semi-spherical raised elements 34 on which the baby can chew for helping to ease the itching sensations of teething. The entire teething rail 22 is preferably molded in one piece from a soft rubber of the type that is typically used in teething rings. When not in use, the teething rail 22 can be conveniently carried in a small bag or pouch 36 with a drawstring 38 for helping to keep it sanitary. The teething rail can be sanitized between uses by washing it with soap and water. All edges and corners are rounded to help keep the baby safe.

We claim:

1. A teething rail for use on the tubular handle of a shopping cart comprising:

a resilient split tube having a circular circumference greater than 180 degrees and less than 360 degrees such that the split tube has longitudinal edges spaced apart a distance less than the diameter of the handle of the shopping cart;

said split tube being made of soft rubber and having an inner diameter slightly smaller than the diameter of the tubular handle of the shopping cart so that the teething rail can snap onto and off of the handle and will grip the handle;

said split tube having integral smooth, semi-spherical, rounded convex protrusions on the outside for a baby to chew on;

said protrusions having a height less than the diameter thereof for safety purposes.

2. The teething rail of claim 1 wherein said longitudinal edges are flared outwardly from the circumference of said split tube.

* * * * *